United States Patent
Kato et al.

(10) Patent No.: US 11,055,036 B2
(45) Date of Patent: Jul. 6, 2021

(54) ADVERTISEMENT SYSTEM, SERVER APPARATUS, AND PROGRAM PRODUCT THAT DECIDES ON DISTRIBUTING ADVERTISEMENT DATA BASED ON PRINTING QUALITY EVALUATION

(71) Applicant: SEIKO EPSON CORPORATION, Tokyo (JP)

(72) Inventors: Hideki Kato, Matsumoto (JP); Kan Matsuda, Shiojiri (JP); Tomomi Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/880,413

(22) Filed: May 21, 2020

(65) Prior Publication Data

US 2020/0371726 A1  Nov. 26, 2020

(30) Foreign Application Priority Data

May 24, 2019  (JP) .............................. JP2019-097863

(51) Int. Cl.
*G06F 3/12* (2006.01)
*H04L 29/08* (2006.01)
(Continued)

(52) U.S. Cl.
CPC .......... *G06F 3/1208* (2013.01); *G06F 3/1234* (2013.01); *G06F 3/1243* (2013.01); *G06F 3/1268* (2013.01); *G06F 3/1285* (2013.01); *G06Q 30/0241* (2013.01); *H04L 67/10* (2013.01); *H04N 1/00047* (2013.01);
(Continued)

(58) Field of Classification Search
CPC .......... H04N 1/00047; H04N 1/00063; H04N 1/00079; H04N 1/00082; H04N 1/00084; H04N 1/00087; H04N 1/00344; H04N 1/32545; H04N 2201/0087; G06F 3/1208; G06F 3/1234; G06F 3/1235; G06F 3/1243; G06F 3/1256; G06F 3/1285; G06F 3/126; G06F 3/1267; G06F 3/1268; G06F 3/1269; G06Q 30/02; G06Q 30/0241; G06Q 30/0242; G06Q 30/0244; G06Q 30/0276; G06K 9/036; G06K 15/1884; G06T 2207/30144
See application file for complete search history.

(56) References Cited

U.S. PATENT DOCUMENTS

| | | | | |
|---|---|---|---|---|
| 8,189,231 | B1 * | 5/2012 | Taylor | G06F 3/1255 358/1.9 |
| 2009/0319371 | A1 * | 12/2009 | Young | G06Q 30/02 705/14.54 |
| 2020/0371731 | A1 * | 11/2020 | Kato | G06Q 30/0276 |

FOREIGN PATENT DOCUMENTS

| | | | |
|---|---|---|---|
| JP | 2004070213 A | * | 3/2004 |
| JP | 2005-259018 | | 9/2005 |

* cited by examiner

*Primary Examiner* — Scott A Rogers
(74) *Attorney, Agent, or Firm* — Workman Nydegger

(57) ABSTRACT

An advertisement system includes a distribution member computer that causes a printer to print the test image data received from a posting server and transmits read data obtained by reading an image of a printed matter obtained by printing test image data by the printer to a posting server, and the posting server including an evaluation unit that evaluates printing quality of the printed matter based on the read data and a decision unit that determines whether to distribute the advertisement data to the distribution member computer based on an evaluation result by the evaluation unit.

7 Claims, 12 Drawing Sheets

(51) Int. Cl.
*H04N 1/00* (2006.01)
*H04N 1/32* (2006.01)
*G06Q 30/02* (2012.01)

(52) U.S. Cl.
CPC ..... *H04N 1/00063* (2013.01); *H04N 1/00079* (2013.01); *H04N 1/00344* (2013.01); *H04N 1/32545* (2013.01); *G06T 2207/30144* (2013.01); *H04N 2201/0081* (2013.01); *H04N 2201/0082* (2013.01); *H04N 2201/0087* (2013.01)

FIG. 4

| DISTRIBUTION MEMBER ID | PASSWORD | DISTRIBUTABLE AREA INFORMATION | DISTRIBUTABLE DATE INFORMATION | DISTRIBUTABLE NUMBER OF SHEETS | E-MAIL ADDRESS | PRINTER IDENTIFICATION INFORMATION |
|---|---|---|---|---|---|---|
| abc-123 | ssttuu | 1-chome, * city to 3-chome, * city | From April 15 to April 20 From April 23 to April 28 ⋮ | 50 SHEETS/DAY | abc@bbb.cc | 333-345-111 |
| sss-456 | opqrstu | 4-chome, * city 5-chome, * city | From April 15 to April 20 From May 6 to May 10 ⋮ | 80 SHEETS/DAY | opq@sss.ttt | 111-222-999 |
| ⋯ | ⋯ | ⋯ | ⋯ | ⋯ | ⋯ | ⋯ |

| USER ID | E-MAIL ADDRESS | RECEPTION DATE AND TIME INFORMATION | REQUEST INFORMATION |
|---|---|---|---|
| ABC-555 | ○×@○○×× | PM 15:20, April 14, 2019 | ADVERTISEMENT DATA DISTRIBUTION CONDITION |
| RRR-333 | △▽@××□■ | AM 10:14, June 14, 2018<br>AM 15:20 February 15, 2019 | ADVERTISEMENT DATA DISTRIBUTION CONDITION |
| . . . | . . . | . . . | . . . |

237

ADVERTISEMENT SYSTEM, SERVER APPARATUS, AND PROGRAM PRODUCT THAT DECIDES ON DISTRIBUTING ADVERTISEMENT DATA BASED ON PRINTING QUALITY EVALUATION

The present application is based on, and claims priority from JP Application Serial Number 2019-097863, filed May 24, 2019, the disclosure of which is hereby incorporated by reference herein in its entirety.

BACKGROUND

1. Technical Field

The present disclosure relates to an advertisement system, a server apparatus, a non-transitory computer-readable storage medium, and a method of controlling a server apparatus.

2. Related Art

In the related art, a system that issues an advertisement medium on which an advertisement image is printed by a printing apparatus is known. For example, JP-A-2005-259018 discloses a system in which an advertisement design information is created by editing an advertisement image information transmitted from an advertiser, print information is generated based on the created design information, and a flyer on which the advertisement image is printed is issued at the advertising distribution site by printing an advertisement image based on generated print information.

However, when an advertisement image is printed by the printing apparatus disposed at each site, there is no mechanism for ensuring printing quality.

SUMMARY

According to an aspect of the present disclosure, an advertisement system includes a server apparatus that distributes advertisement data, and a control device that causes a printing apparatus to the print distributed advertisement data, wherein the control device causes the printing apparatus to print test image data, transmits, to the server apparatus, read data obtained by reading a printed matter of the test image data, and wherein the server apparatus includes an evaluation unit that evaluates printing quality of the printed matter based on the read data, and a decision unit that decides whether to distribute the advertisement data to the control device based on an evaluation result by the evaluation unit.

In the above advertisement system, the decision unit may not distribute the advertisement data to the control device when an elapsed time from transmission of the test image data to the control device to reception of the read data is greater than a preset time.

In the above advertisement system, the control device may transmit, to the server apparatus, the read data and a printing date and time when the printing apparatus prints the test image data, wherein the decision unit may not distribute the advertisement data to the control device when a difference between the printing date and time, and a date and time when the read data is received is greater than a preset time.

In the above advertisement system, the printing apparatus may include a communication unit, wherein the read data may include identification information of the printing apparatus that printed the test image data, and wherein the decision unit may identify the printing apparatus based on the identification information and distribute the advertisement data to the identified printing apparatus.

In the above-mentioned advertisement system, the decision unit may instruct the control device to perform maintenance of the printing apparatus when the evaluation unit determines that the printing quality is poor.

According to another aspect of the present disclosure, a server apparatus that distributes advertisement data includes a communication unit that receives read data obtained by reading a printed matter on which test image data is printed, an evaluation unit that evaluates printing quality of the printed matter based on the read data received by the communication unit, and a decision unit that decides whether to distribute the advertisement data to a transmission source of the read data based on an evaluation result by the evaluation unit.

According to still another aspect of the present disclosure, a non-transitory computer-readable storage medium storing a program causes a computer of a server apparatus that distributes advertisement data to execute a method. The method includes receiving read data obtained by reading a printed matter on which the test image data is printed, evaluating printing quality of the printed matter based on the read data received by the receiving the read data, and deciding whether to distribute the advertisement data to a transmission source of the read data based on an evaluation result by the evaluating the printing quality.

According to still another aspect of the present disclosure, a method of controlling a server apparatus that distributes advertisement data includes receiving read data obtained by reading a printed matter on which the test image data is printed, evaluating printing quality of the printed matter based on the read data received by the receiving the read data, and deciding whether to distribute the advertisement data to a transmission source of the read data based on an evaluation result by the evaluating the printing quality.

BRIEF DESCRIPTION OF THE DRAWINGS

FIG. 4 is a configuration diagram of a distribution member registration database.

FIG. 5 is a configuration diagram of a request information management database.

DESCRIPTION OF EXEMPLARY EMBODIMENTS

First Embodiment

Figure 1:
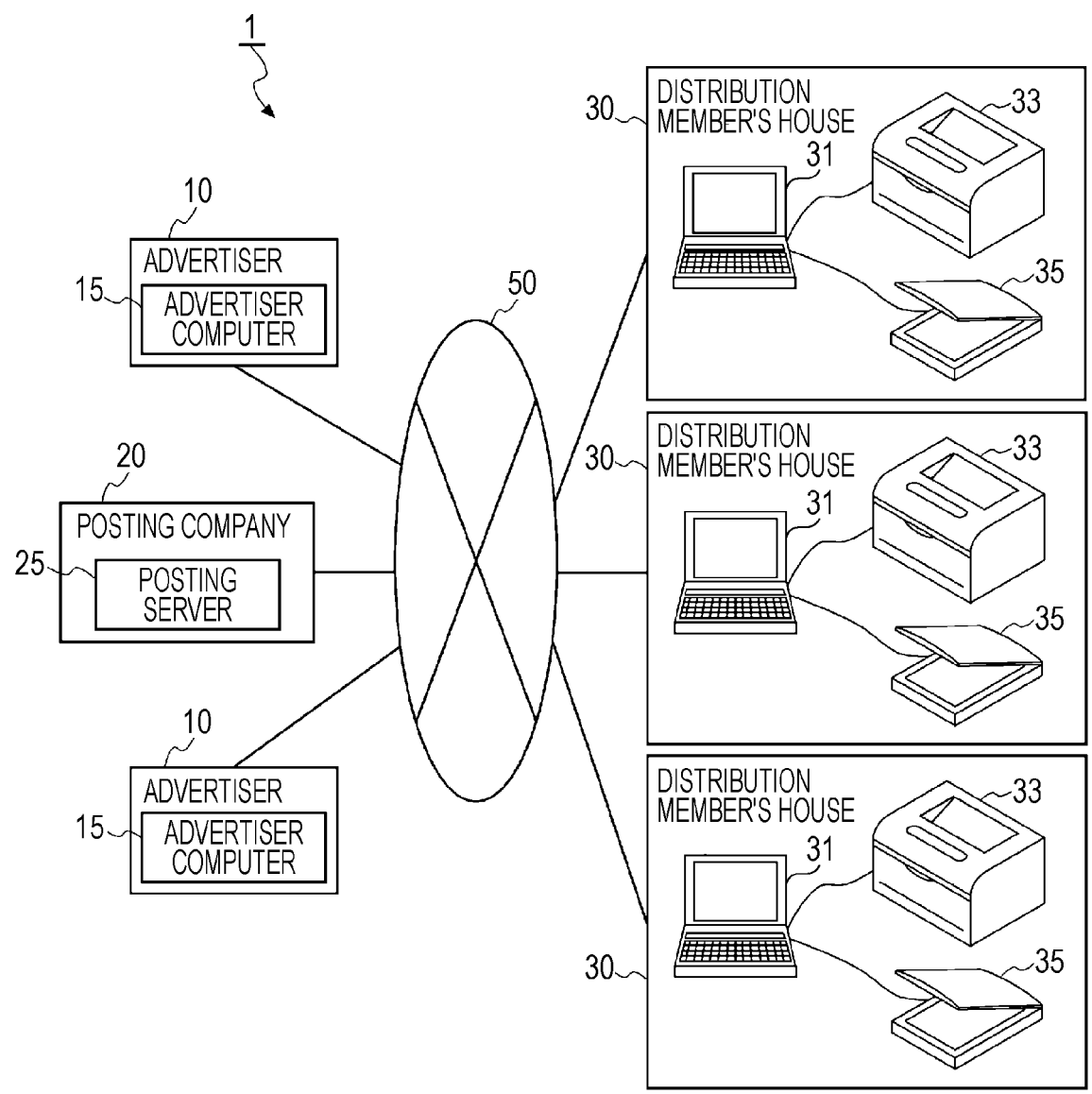
FIG. 1 is a system configuration diagram of an advertisement system.

FIG. 1 is a system configuration diagram of an advertisement system 1. The advertisement system 1 is a system for posting advertisements for products and services provided by an advertiser 10. The advertisement system 1 includes an advertiser computer 15 managed by the advertiser 10, a posting server 25 managed by a posting company 20, and a distribution member computer 31 managed by a distribution member. The advertiser computer 15, the posting server 25, and the distribution member computer 31 are configured to be connectable to a network 50. Although FIG. 1 shows the two advertiser computers 15 and the three distribution member computers 31, the number of the advertiser computers 15 and the number of the distribution member computers 31 are not limited. The posting server 25 corresponds to the "server apparatus" of the present disclosure.

The advertiser 10 is a provider of goods and services, and uses the advertiser computer 15 and the like to generate advertisement data serving as a source of an advertising material in which information on goods and services provided by the advertiser 10 is posted. The advertisement data may be created by the advertiser 10 by the advertiser computer 15 or may be created by another company requested by the advertiser 10.

The advertiser computer 15 has a web browser installed in advance. The advertiser 10 operates the advertiser computer 15 to activate the web browser installed on the advertiser computer 15 and access a web page provided by the posting server 25.

The advertiser computer 15 receives the web page of an authentication screen from the posting server 25, and displays the authentication screen for authenticating the user based on the received web page on a display. When the authentication screen is displayed on the display, the advertiser 10 inputs a user ID and a password from a keyboard. The user ID and password are information for authenticating the user. For example, when the web page is first accessed, it is set by the advertiser 10, or it is set by the posting server 25.

When the authentication process is completed, the advertiser computer 15 receives the web page for specifying advertising distribution conditions and the like from the posting server 25 and displays the web page on the display. The advertiser 10 inputs the distribution conditions of the advertisement on the displayed web page. The distribution conditions include a desired distribution area in which the advertising material is distributed, the desired number of distribution sheets, a desired distribution period, and the like. For example, a condition such as "distributing a total of 500 sheets of the advertising material with 100 sheets a day for 5 days on weekdays from * date and month to * data and month" is set.

In addition, the advertiser computer 15 receives the web page for uploading advertisement data from the posting server 25 and displays the web page on the display. The advertiser 10 operates a button displayed on the web page to select a directory of the advertiser computer 15 in which the advertisement data to be uploaded to the posting server 25 is stored. When the advertiser 10 presses the upload button displayed on the web page, request information including distribution conditions and advertisement data is uploaded to the posting server 25.

When the distribution conditions and the advertisement data are uploaded from the advertiser computer 15, the posting server 25 stores the uploaded distribution conditions and the advertisement data in a server storage unit 230 described later. The posting company 20 that manages the posting server 25 has contracted with a plurality of distribution members who is in charge of distributing the advertisement. Distribution member registration information of the contracted distribution member is registered in the posting server 25. Details of the distribution member registration information will be described with reference to FIG. 4. The posting server 25 selects a distribution member to distribute the advertising material based on the distribution conditions and the distribution member registration information set by the distribution member. Upon selecting the distribution member, the posting server 25 causes a printer 33 corresponding to the selected distribution member to perform a printing quality test. The printer 33 is a printer used when the selected distribution member prints the advertisement data to generate the advertising material. When the printing quality of the advertising material generated by the printer 33 is "good", the posting server 25 causes the printer 33 of the selected distribution member to print the advertisement data via the distribution member computer 31, and performs a process for requesting the selected distribution member to distribute the advertising material.

In addition, when the printing quality of the advertising material generated by the printer 33 is "poor", the posting server 25 causes the printer 33 to perform nozzle cleaning, and causes the printer 33 to perform the printing quality test again. Further, when the printing quality test is not passed even after the printing quality test of the printer 33 is performed a preset number of times, the posting server 25 may select another distribution member, and cause the selected distribution member to perform the printing quality test of the printer 33.

The distribution member computer 31, the printer 33, and a scanner 35 are installed in a distribution member's house 30, which is the residence of the distribution member. The distribution member computer 31 can be connected to the network 50 and access the posting server 25. In addition, the printer 33 and the scanner 35 are connected to the distribution member computer 31. The printer 33 corresponds to the "printing apparatus" of the disclosure. In addition, the distribution member computer 31 corresponds to the "control device" of the present disclosure.

The distribution member computer 31 may be owned by the distribution member, or may be lent by the posting company 20. Further, in the present embodiment, a laptop computer is exemplified as the distribution member computer 31, but it may be a desktop computer or a tablet computer. In addition, the distribution member computer 31 may be a smartphone.

The printer 33 is, for example, a continuous ink supply system (CISS) type printing apparatus in which an ink tank that supplies ink to an ink jet head can be separately filled with the ink. In the present embodiment, the printer 33 is, for example, a stationary printing apparatus installed at a distribution member's house that makes a predetermined contract with the posting company 20 and distributes the advertising material. The printer 33 may be owned by a distribution member or lent by the posting company.

The scanner 35 is a reading device that reads an image of a printed matter printed by the printer 33. FIG. 1 shows the flood bed type scanner 35, but it may be a sheet feed type scanner or a stand type scanner. Further, a multifunction machine including the printer 33 and the scanner 35 may be used. The scanner 35 may also be owned by the distribution member or lent by the posting company.

Figure 2:
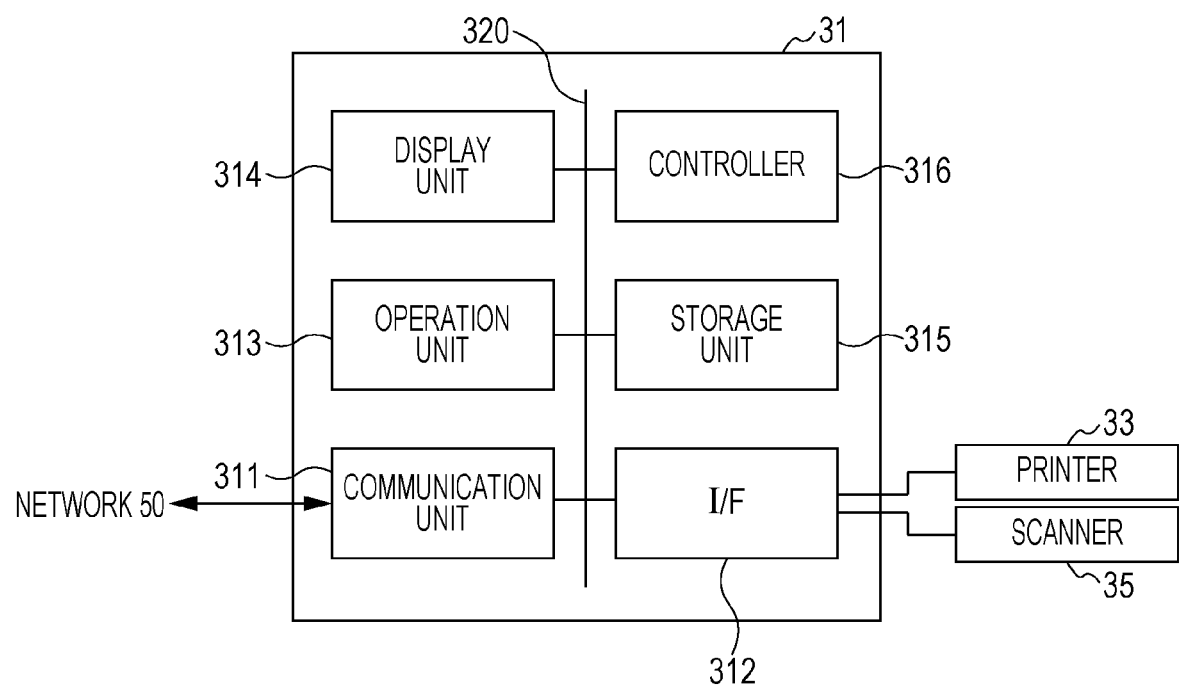
FIG. 2 is a configuration diagram of a distribution member computer.

FIG. 2 is a block diagram showing a configuration of the distribution member computer 31. The distribution member computer 31 includes a communication unit 311, an interface 312, an operation unit 313, a display unit 314, a storage unit 315, and a controller 316, and has a configuration in which these units are connected in data communication to each other via a bus 320. Hereinafter, the interface 312 is abbreviated as an I/F 312. The communication unit 311 is connected to the network 50 to perform data communication with the posting server 25. The I/F 312 is an interface for connection with the printer 33 and the scanner 35.

The operation unit 313 includes input devices such as a mouse and a keyboard, and receives an operation of a distribution member. The display unit 314 is a display including a display panel such as a liquid crystal panel or an organic EL panel. The storage unit 315 is a storage device such as a hard disk drive (HDD) or a solid state drive (SSD). The controller 316 includes a processor such as a central processing unit (CPU) and a micro processing unit (MPU), and a memory such as a read only memory (ROM) and a random access memory (RAM) is provided. The controller 316 executes a control program stored in the memory or the storage unit 315 to control respective units of the distribution member computer 31.

Figure 3:
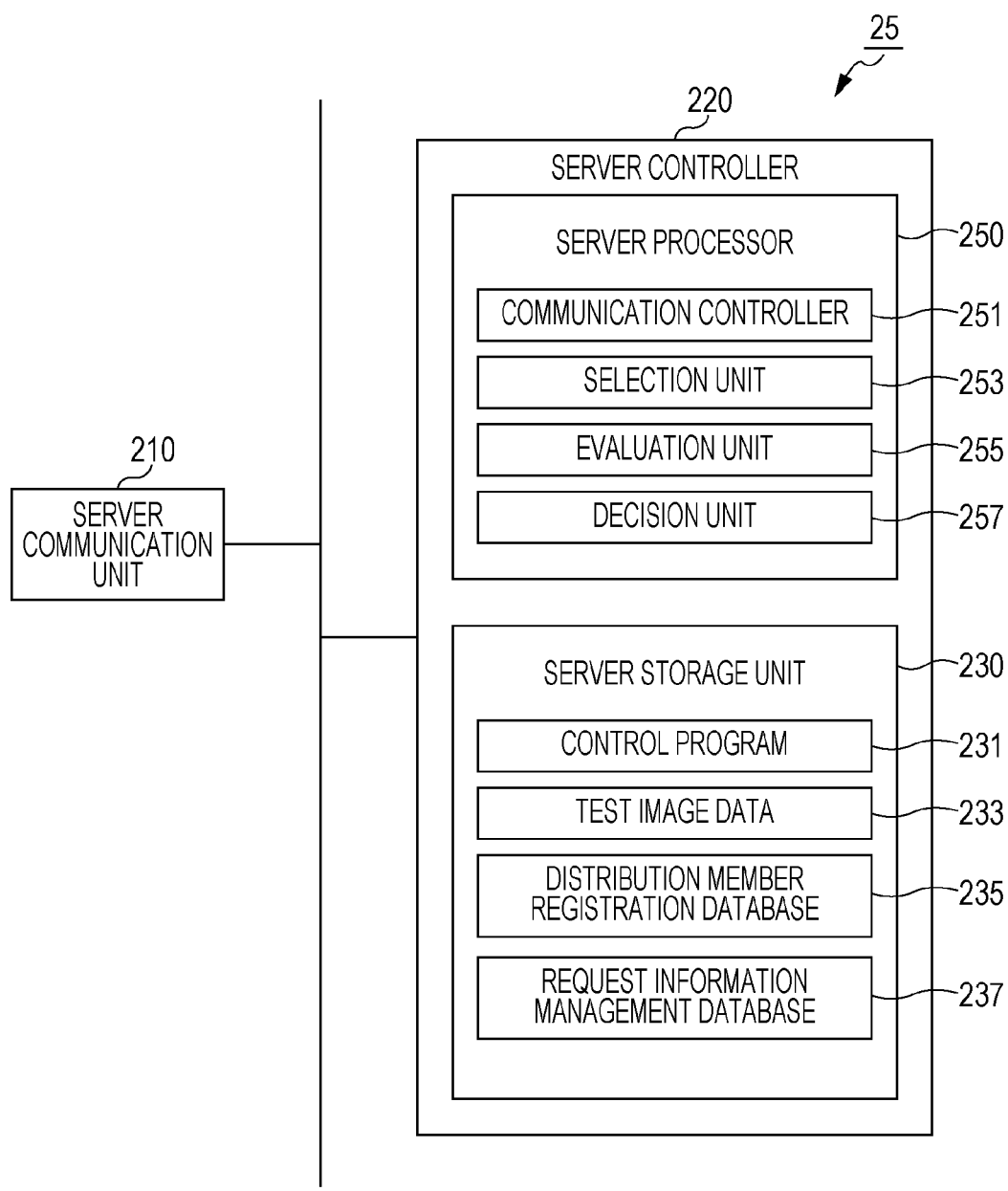
FIG. 3 is a configuration diagram of a posting server.

FIG. 3 is a block diagram showing a configuration of the posting server 25. The posting server 25 includes a server communication unit 210 and a server controller 220. The server communication unit 210 is connected to the network 50, and performs data communication with the advertiser computer 15 and the distribution member computer 31 connected to the network 50. The server communication unit 210 corresponds to the "communication unit" of the present disclosure.

The server controller 220 includes the server storage unit 230 and a server processor 250. The server storage unit 230 includes a nonvolatile storage area that stores programs and data in a nonvolatile manner, and a volatile storage area that forms a work area for temporarily storing a program executed by the server processor 250 and data to be processed. FIG. 3 shows a case where the server controller 220 includes the server storage unit 230, but the server storage unit 230 may be provided outside the server controller 220.

The server storage unit 230 stores a control program 231 executed by the server processor 250, test image data 233, a distribution member registration database 235, a request information management database 237, and other various pieces of data. The test image data 233 is image data for testing the printing quality of the printer 33. More specifically, the test image data 233 is data for performing a nozzle check, which is a check of nozzle clogging of the ink jet head.

FIG. 4 is a diagram schematically showing the configuration of the distribution member registration database 235. In the distribution member registration database 235, distribution member registration information is registered in association with a distribution member ID. The distribution member registration information includes a password, distributable area information, distributable date information, a distributable number of sheets, and printer identification information.

The distribution member ID and the password are identification information for identifying the distribution member, and are set by the posting server 25 or the distribution member when the distribution member is registered. The distribution member ID and the password are used, for example, when signing in to a web page provided by the posting server 25.

The distributable area information is information indicating an area where the distribution member of the distribution member ID can distribute the advertising material, and is set based on the application information of the distribution member when the distribution member is registered. The distributable date information is information in which the distribution member of the distribution member ID registers the date when the advertising material can be distributed. In addition to the distributable date information, a date when the advertising material cannot be distributed may be registered in the distribution member registration database 235. The distributable number of sheets is information indicating the number of sheets of the advertising material that can be distributed per unit period by the distribution member of the distribution member ID. For the unit period, for example, a predetermined period such as one day, one week, one month, six months, or the like is set.

The printer identification information is identification information of the printer 33 used by the distribution member of the distribution member ID. Examples of the printer identification information include a model name of the printer 33 and a registered name registered by the distribution member. Further, when the printer 33 includes a local area network (LAN) card, and has a function of connecting to the network 50, an IP address or a MAC address may be used as printer identification information. By registering the IP address and MAC address in the posting server 25, advertisement data can also be transmitted from the posting server 25 to the printer 33 when the printer 33 is connected to the network 50. The printer identification information corresponds to "identification information of the printing apparatus" of the present disclosure.

FIG. 5 is a diagram schematically showing the configuration of the request information management database 237. In the request information management database 237, an e-mail address, reception date and time information, and request information are registered in association with the user ID. The user ID is identification information for identifying the advertiser 10, and is information set by the advertiser 10 or the posting server 25 when the advertiser 10 starts using the service provided by the posting company. The e-mail address is an e-mail address of the advertiser corresponding to the user ID. The reception date and time information is information indicating a reception date and time when the request information was received from the advertiser computer 15. The request information includes the distribution conditions and the advertisement data described above.

Returning to FIG. 3, the configuration of the posting server 25 will be described continuously. The server processor 250 is a processor that executes programs of a CPU, an MPU and the like. The server controller 220 functions as a communication controller 251, a selection unit 253, an evaluation unit 255, and a decision unit 257 when the server processor 250 executes the control program 231. These functions shown in FIG. 3 are implemented by the server processor 250 executing an instruction set described in the control program 231 to perform data calculation and control.

The communication controller 251 controls the server communication unit 210 to be connected to the network 50, and performs data communication with the advertiser computer 15 and the distribution member computer 31. The selection unit 253 selects the distribution member to distribute the advertising material. The evaluation unit 255 evaluates the printing quality of the printer 33 owned by the distribution member selected by the selection unit 253. The decision unit 257 decides whether to transmit the advertisement data to the transmission source of the read data based on the evaluation result by the evaluation unit 255.

Figure 6:
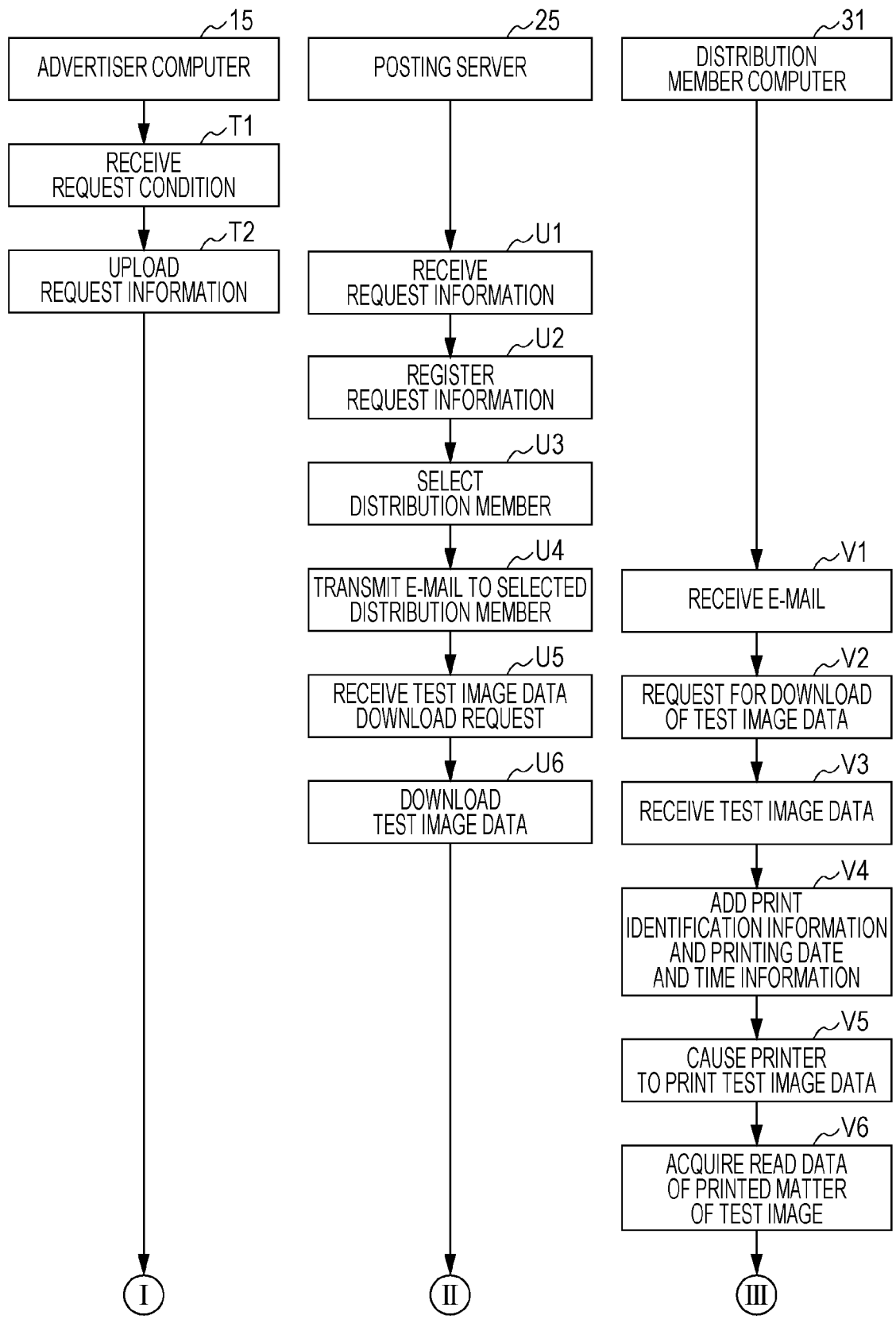
FIG. 6 is a flowchart showing the operation of the advertisement system.
Figure 7:
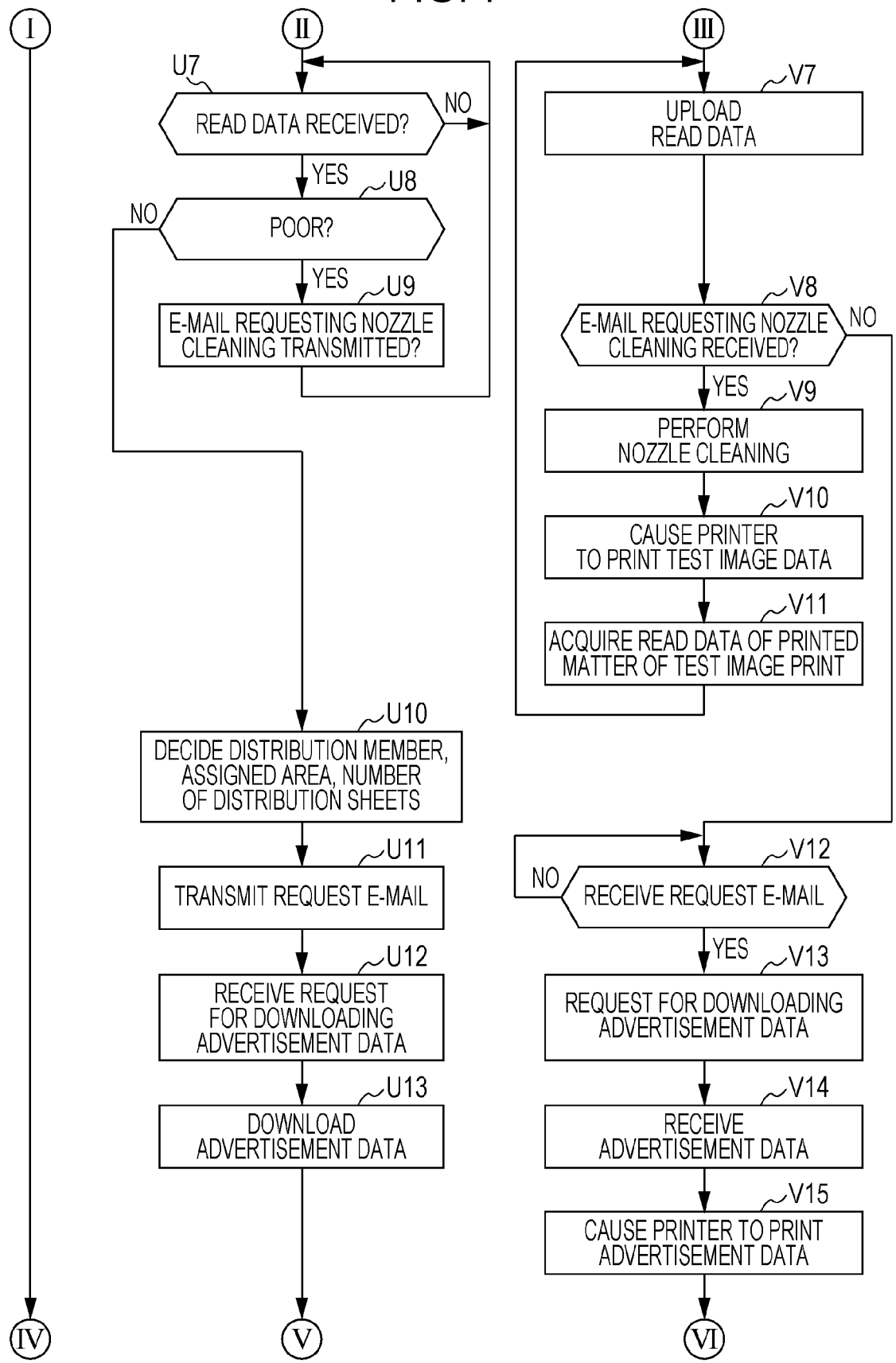
FIG. 7 is a flowchart showing the operation of the advertisement system.
Figure 8:
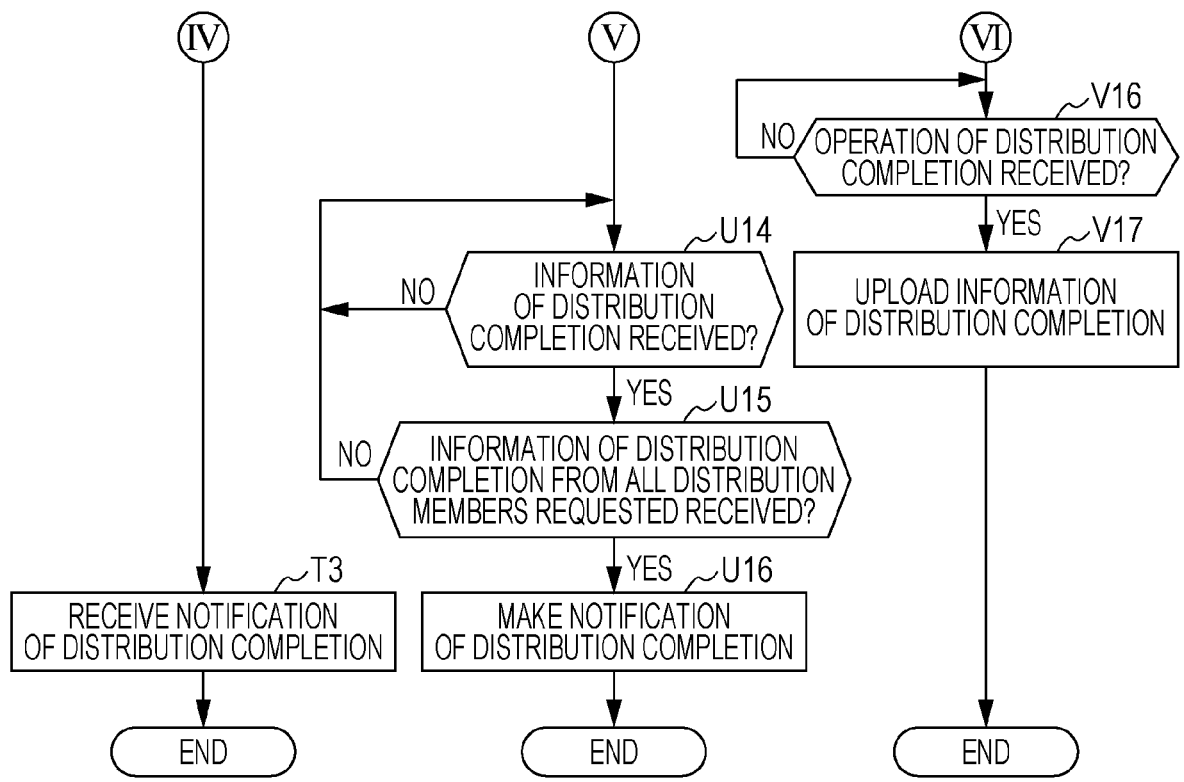
FIG. 8 is a flowchart showing the operation of the advertisement system.

FIGS. 6 to 8 are flowcharts showing the operations of the advertiser computer 15, the posting server 25, and the distribution member computer 31 constituting the advertisement system 1. The operation of the advertisement system 1 will be described with reference to the flowcharts shown in FIGS. 6 to 8. The advertiser computer 15 accesses the posting server 25 and displays a web page provided by the posting server 25 on a display. Input fields for advertisement distribution conditions and the like are displayed on this web page. The distribution conditions include a desired distribution area, the desired number of distribution sheets, and a desired distribution period. The advertiser computer 15 receives distribution conditions by the operation of the advertiser 10 (step T1). When the upload button is pressed, the advertiser computer 15 uploads the request information including distribution conditions and the advertisement data input in step T1 to the posting server 25 (step T2).

Upon receiving the request information from the advertiser computer 15 (step U1), the posting server 25 registers the received request information in the request information management database 237 in association with the user ID for identifying the advertiser (step U2).

Next, the selection unit 253 of the posting server 25 selects, based on distribution conditions included in the request information uploaded from the advertiser computer 15 and distribution member registration information, the distribution member who is requested to distribute the advertising material (step U3). Here, the process of selecting the distribution member will be specifically described. First, the selection unit 253 extracts the distribution member who can distribute the advertising material to the desired distribution area set by the advertiser 10. Next, the selection unit 253 sets a distribution date or a distribution period when the advertising material is distributed. For example, it is assumed that the desired distribution period specified by the advertiser 10 is two weeks from April 1 to April 15. In this case, the selection unit 253 may select, for example, a distribution member who distributes the advertising material on a weekly basis, or a distribution member who distributes the advertising material on a daily basis. Here, a case will be described where the selection unit 253 selects a distribution member on a daily basis. The distribution date set by the selection unit 253 is referred to as a "set distribution date".

The selection unit 253 refers to the distributable date information of the extracted distribution member and selects a distribution member who can distribute the advertising material on the set distribution date (step U3). For example, when April 1 is set as the set distribution date, the selection unit 253 selects a distribution member who is registered to have the distributable date information including April 1.

Further, the selection unit 253 further selects a distribution member based on the number of sheets of the advertising material to be distributed on the set distribution date and the distributable number of sheets that each distribution member can distribute (step U3). For example, it is assumed that the desired distribution period set by the advertiser 10 is two weeks from April 1 to April 15, and the desired number of distribution sheets is 1400. It is also assumed that, as a method of distributing the advertising material, a setting is made such that the advertising material is evenly distributed 100 sheets in 14 days. When setting, for example, April 1 as the set distribution date, the selection unit 253 divides 1400 sheets, which is the desired number of distribution sheets, by 14 days, which is the desired distribution period to determine that the number of distribution sheets per day is 100. The selection unit 253 selects a distribution member based on the distributable number of sheets so that it is possible to distribute 100 or 100 or more sheets of the advertising material on April 1, which is the set distribution date.

When the distribution member is selected by the selection unit 253, the evaluation unit 255 transmits an e-mail to the e-mail address of the distribution member selected by the selection unit 253 (step U4). This e-mail includes a uniform resource locator (URL) of a web page from which the test image data 233 can be downloaded. Further, the posting server 25 may transmit an e-mail attached with the test image data 233 to the e-mail address of the selected distribution member.

Here, the test image data 233 to be downloaded to the distribution member computer 31 will be described. The evaluation unit 255 may select the test image data 233 to be downloaded to the distribution member computer 31 based on the advertisement data serving as the source of the advertising material which the distribution member distributes. For example, when the advertisement data is black and white image data, the evaluation unit 255 selects the black and white test image data 233 as the test image data 233. When the advertisement data is color image data, the evaluation unit 255 selects the color test image data 233 as the test image data 233. Further, the evaluation unit 255 may select the test image data 233 including the color data with a color same as that of the color data included in the advertisement data. For example, when the advertisement data includes color data of red, blue and black, the test image data 233 including the color data of red, blue and black is selected. Further, the evaluation unit 255 may use part or all of the advertisement data registered in the request information management database 237 as the test image data 233. That is, image data including part or all of the advertisement data may be used as the test image data 233.

The distribution member computer 31 receives the e-mail transmitted from the posting server 25 (step V1). The distribution member computer 31 accesses the web page of the URL described in the e-mail received from the posting server 25 based on the operation by the distribution member on the keyboard and the mouse of the operation unit 313. An authentication screen for authenticating the distribution member is displayed on the display unit 314 of the distribution member computer 31. When the authentication screen is displayed on the display unit 314, the distribution member operates the operation unit 313 to input the distribution member ID and the password, and receives the user authentication. Each time the posting server 25 receives an access from the distribution member computer 31, the posting server 25 causes the distribution member computer 31 to display the authentication screen to perform the user authentication. However, a description of the user authentication will be omitted below.

When the authentication process is completed, the distribution member computer 31 displays a web page for downloading the test image data 233 on the display unit 314. The distribution member computer 31 transmits, to the posting server 25, a request for downloading the test image data 233 according to the distribution member's operation on the displayed web page (step V2). When receiving the download request from the distribution member computer 31 (step U5), the posting server 25 downloads the test image data 233 to the distribution member computer 31 (step U6). The distribution member computer 31 receives the test image data 233 downloaded from the posting server 25 (step V3).

The distribution member computer 31 adds printer identification information and printing date and time information to the received test image data 233 (step V4). The current time is used as the printing date and time information. The distribution member computer 31 outputs, to the printer 33, the test image data 233 to which the printer identification information and the printing date and time information are added, and causes the printer 33 to perform printing (step V5).

When the test image data 233 is printed by the printer 33, the distribution member causes the scanner 35 to scan the printed matter of the test image data 233. The distribution member computer 31 acquires the read data of the scan result from the scanner 35 (step V6). Next, the distribution member computer 31 accesses the posting server 25 and displays a web page for uploading the read data on the display unit 314. Upon receiving the operation of dragging and dropping the read data read by the scanner 35 onto the web page, the distribution member computer 31 uploads the read data to the posting server 25 through a file transfer protocol (FTP) or the like (step V7).

When the read data has not been received from the distribution member computer 31 (step U7/NO), the posting server 25 waits until the read data is uploaded from the distribution member computer 31. When the read data is uploaded from the distribution member computer 31 (step U7/YES), the posting server 25 stores the uploaded read data in the server storage unit 230. Further, the posting server 25 evaluates the printing quality of the printed matter by the evaluation unit 255 based on the uploaded read data.

First, the evaluation unit 255 extracts printer identification information from the read data, and determines whether the extracted printer identification information is registered in the distribution member registration database 235 in association with the distribution member ID of the distribution member. When the printer identification information extracted from the read data is not registered in the distribution member registration database 235 in association with the distribution member ID, the evaluation unit 255 transmits, to the e-mail address of the distribution member, an e-mail indicating that the printer 33 is registered. This e-mail contains a guidance for performing a printing quality test by the registered printer 33, and a guidance for instructing the printer 33 to be re-register when changing the printer 33 to be used.

When the printer identification information extracted from the read data is registered in the distribution member registration database 235 in association with the distribution member ID, the evaluation unit 255 evaluates the printing quality of the print image. For example, the evaluation unit 255 performs pattern matching of a print image of a printed matter read by the scanner 35 with a registered image prepared in advance to evaluate the printing quality of the print image. When part of the print image is missing or blurred, the evaluation unit 255 determines that the printing quality of the print image is "poor". When determining that the printing quality of the print image is "poor" (step U8/YES), the evaluation unit 255 transmits an e-mail requesting performance of nozzle cleaning to the e-mail address of the distribution member (step U9). The nozzle cleaning corresponds to "maintenance of the printing apparatus" of the present disclosure. This e-mail also contains a guidance requesting that the test image data 233 be printed again by the printer 33 after the performance of nozzle cleaning and the read data obtained by reading the printed matter that has been printed be uploaded.

When the distribution member computer 31 has not received, from the posting server 25, an e-mail instructing performance of nozzle cleaning (step V8/NO), the process proceeds to step V12. Further, when the distribution member computer 31 receives, from the posting server 25, an e-mail instructing performance of nozzle cleaning (step V8/YES), the distribution member computer 31 instructs the printer 33 to perform nozzle cleaning (step V9). Thereafter, the distribution member computer 31 transmits the test image data 233 to the printer 33 to cause the printer 33 print the test image (step V10). After the distribution member sets the printed matter of the test image on the scanner 35 to cause the scanner 35 to scan the printed matter, the distribution member computer 31 acquires the read data of the scan result from the scanner 35 (step V11).

When the read data read by the scanner 35 is dragged and dropped onto the web page by the operation of the operation unit 313 by the distribution member, the distribution member computer 31 uploads the read data to the posting server 25 through the FTP or the like (step V7).

The posting server 25 evaluates the printing quality of the printed matter based on the read data received from the distribution member computer 31 or the read data received again from the distribution member computer 31. When the print image has no missing portion or blurred portion, the evaluation unit 255 determines that the printing quality of the print image is "good" (step U8/NO).

Here, the evaluation unit 255 may extract the printing date and time information from the read data, and when the elapsed time between the date and time indicated by the extracted printing date and time information and the current date and time is a preset time or more, instead of evaluating the printing quality of the print image, the evaluation unit 255 may transmit an e-mail requesting re-performance of the printing quality test to the e-mail address of the relevant distribution member. In addition, the evaluation unit 255 may cause the server storage unit 230 to store, in association with the distribution member ID, the information of the date and time when the distribution member computer 31 downloaded the test image data 233. The evaluation unit 255 extracts the printer identification information from the read data, and acquires the distribution member ID associated with the extracted printer identification information with reference to the distribution member registration database 235. The evaluation unit 255 may instruct the distribution member computer 31 to re-perform the printing quality test when the elapsed time between the date and time when the distribution member computer 31 downloaded the test image data 233 and the date and time when the read data was uploaded is a preset time or more. Further, the evaluation unit 255 may cause the distribution member computer 31 not to be able to download the advertisement data when the elapsed time between the date and time when the distribution member computer 31 downloaded the test image data 233 and the date and time when the read data was uploaded by the distribution member computer 31 is a preset time or more.

Next, when the decision unit 257 receives the read data from all the distribution members who transmitted the e-mail in step U4, or when a certain period of time has passed since the e-mail was transmitted in step U4, the decision unit 257 decides the distribution member who is to distribute the advertising material, and the distribution area and the number of distribution sheets according to which the distribution member distributes the advertising material (step U10).

First, the decision unit 257 excludes a distribution member who has not uploaded read data even after a certain time has passed and a distribution member whose printer 33 did not pass the printing quality test from the distribution members who are to distribute the advertising material. Next, the decision unit 257 decides an assigned area where the distribution member whose printer has passed the printing quality test distributes the advertising material and the number of distribution sheets of the advertising material. The decision unit 257 decides the total number of distribution sheets to be distributed on the set distribution date, and determines the number of distribution sheets to be distributed to each area based on the obtained total number of distribution sheets. For example, the decision unit 257 may decide the number of distribution sheets based on the population ratios of respective areas. After deciding the number of distribution sheets for each area, the decision unit 257 decides an assigned area where each distribution member distributes the advertising material and the number of distribution sheets of the advertising material based on the decided number of distribution sheets (step U10). At this time, the assigned area is selected from within the distributable area indicated by the distributable area information, and the number of distribution sheets is set to be within the distributable number of sheets.

After deciding the assigned area and the number of distribution sheets for each distribution member, the decision unit 257 generates an e-mail containing the assigned area and the number of distribution sheets that have been decided, and transmits the generated e-mail to the e-mail addresses of the respective distribution members (step U11). This e-mail is hereinafter referred to as a request e-mail. Further, the request e-mail contains the URL of a web page from which the advertisement data can be downloaded.

The distribution member computer 31 determines whether the request e-mail has been received (step V12). When the request e-mail has not been received (step V12/NO), the distribution member computer 31 waits until the request e-mail is received. When receiving the request e-mail (step V12/YES), the distribution member computer 31 accesses the web page of the URL described in the received request e-mail by the operation of the distribution member. The distribution member computer 31 displays, on the display unit 314, the web page from which it is possible to request that the advertisement data be downloaded. The distribution member computer 31 transmits, to the posting server 25, a request for downloading the advertisement data by the operation of the operation unit 313 by the distribution member (step V13). Upon receiving, from the distribution member computer 31, the request for downloading the advertisement data (step U12), the posting server 25 downloads the advertisement data to the distribution member computer 31 (step U13).

The distribution member computer 31 receives the advertisement data downloaded from the posting server 25 (step V14). According to the operation by the distribution member, the distribution member computer 31 outputs the downloaded advertisement data to the printer 33 and causes the printer 33 to print the advertisement data to generate the advertising material for the number of distribution sheets described in the e-mail (step V15).

In addition, the distribution member computer 31 causes the printer 33 to print the request e-mail by the operation of the operation unit 313 by the distribution member. The request e-mail contains the assigned area in which the distribution member is assigned to conduct distribution. In addition, the request e-mail is accompanied by map data indicating the location of the house where the distribution member distributes the advertising material. The distribution member has the advertising material for the number of distribution sheets and the printed matter of the map data, moves to the distribution destination of the advertising material while referring to the map data, and distributes the advertising material at the destination.

After the distribution member distributes the advertising material for the number of distribution sheets to the distribution destination, the distribution member computer 31 accesses the web page provided by the posting server 25 by the operation of the operation unit 313 by the distribution member. The distribution member computer 31 determines by the operation of the operation unit 313 whether an operation of completing the distribution has been received (step V16). When the distribution member computer 31 has not received the operation of completing the distribution (step V16/NO), the distribution member computer 31 waits until receiving the operation of completing the distribution. When receiving the operation of completing the distribution (step V16/YES), the distribution member computer 31 uploads information indicating the completion of the distribution of the advertising material to the posting server 25 (step V17).

When the posting server 25 has not received the information indicating the completion of the distribution from the distribution member computer 31 (step U14/NO), the posting server 25 waits until receiving the information indicating the completion of the distribution. In addition, when the posting server 25 receives the information indicating the completion of the distribution from the distribution member computer 31 (step U14/YES), the posting server 25 determines whether it has received the information indicating the completion of the distribution of the advertising material from all the distribution members who are requested to distribute the advertising material (step U15). The posting server 25 can identify the distribution member by user authentication performed when access from the distribution member computer 31 is received.

When the posting server 25 has not received the information indicating the completion of the distribution from all the distribution members (step U15/NO), the process returns to the determination of step U14. In addition, when the posting server 25 receives the information indicating the completion of the distribution from all distribution members (step U15/YES), the posting server 25 notifies the advertiser computer 15 that the distribution of the advertising material on the set distribution date has been completed (step U16). This notification may be transmitted, through the e-mail, to the e-mail address of the advertiser 10 registered in advance. The advertiser computer 15 receives the notification of the distribution completion by receiving the e-mail from the posting server 25 (step T3).

Further, the posting server 25 may register the completion of the distribution of the advertising material on the set distribution date in a web page provided by the posting server 25. The advertiser computer 15 accesses the web page according to the operation by the advertiser 10 and displays the web page on the display of the advertiser computer 15. The advertiser 10 can recognize that the distribution of the advertising material has been completed on the set distribution date by referring to the web page displayed on the display of the advertiser computer 15.

In the flowcharts shown in FIGS. 6 to 8, the case has been described where the advertisement data is downloaded to the distribution member computer 31, and the distribution member computer 31 outputs the downloaded advertisement data to the printer 33 and causes the printer 33 to perform printing. In another embodiment, when the printer 33 is configured to be connectable to the network 50, the posting server 25 may transmit the advertisement data to the printer 33, and cause the printer 33 to print the advertisement data. For example, the printer 33 has a wireless communication function, and the IP address and the MAC address of the printer 33 as printer identification information are registered in the posting server 25. In this case, the posting server 25 may extract the printer identification information from the read data and transmit the advertisement data to the IP address indicated by the extracted printer identification information.

Also, in the flowcharts shown in FIGS. 6 to 8, the case has been described where the distribution member computer 31 accesses a web page provided by the posting server 25 through an e-mail transmitted from the posting server 25, and transmits and receives data to and from the posting server 25. In another aspect, the distribution member computer 31 and the posting server 25 may transmit and receive data through an application program installed in the distribution member computer 31. Further, in this case, the communication between the posting server 25 and the distribution member computer 31 may be performed by a protocol such as an HTTP other than the e-mail.

Figure 9A:
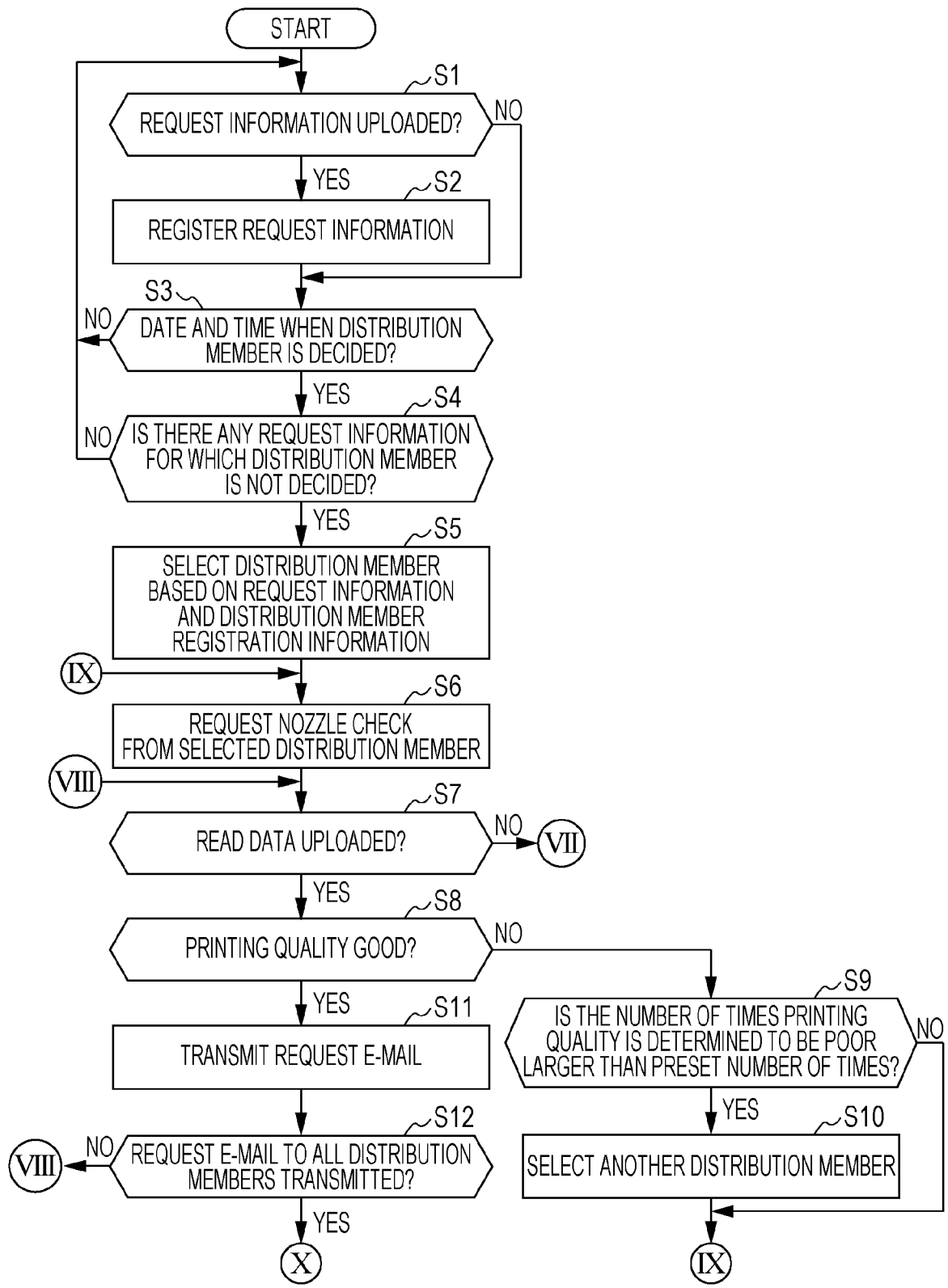
FIG. 9A and FIG. 9B show a flowchart showing the operation of the posting server.
Figure 9B:
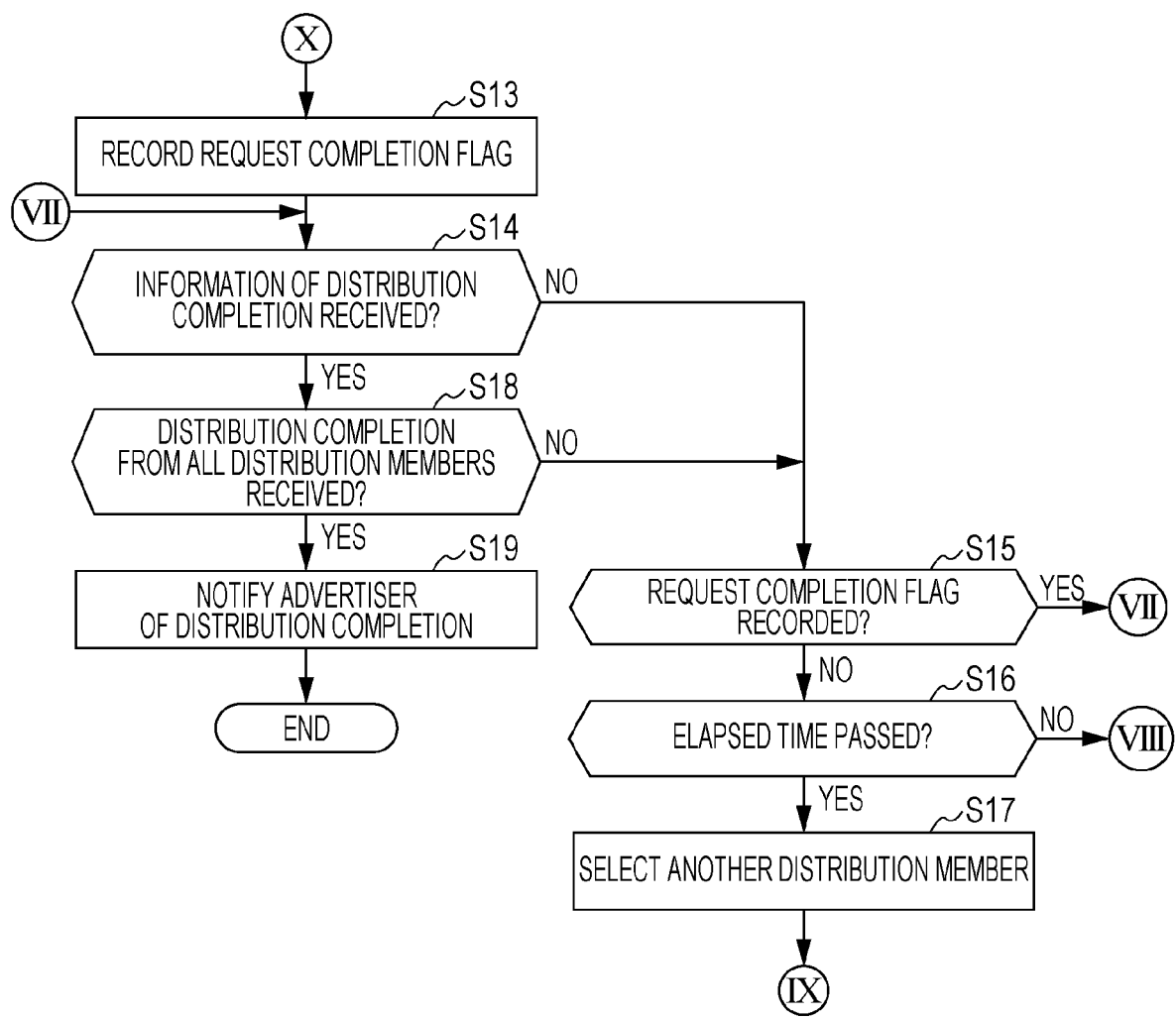

FIG. 9 is a flowchart showing the operation of the posting server 25. The operation of the posting server 25 will be described with reference to the flowchart shown in FIG. 9. First, the server controller 220 determines whether the request information has been uploaded (step S1). When the request information is not uploaded (step S1/NO), the server controller 220 determines whether the current date and time is a preset date and time when the distribution member is decided (step S3). Here, a case will be described in which server controller 220 decides the distribution member at a preset date and time and downloads the advertisement data to the decided distribution member. When the current date and time is not the date and time when the distribution member is decided (step S3/NO), the server controller 220 returns the process to step S1 and determines whether the request information has been received (step S1).

Further, when receiving the request information (step S1/YES), the server controller 220 registers the received request information in the request information management database 237 (step S2), and thereafter, the process proceeds to the determination in step S3.

When the current date and time is the date and time when the distribution member is decided (step S3/YES), the server controller 220 determines whether the request information management database 237 contains request information for which the distribution member is not decided (step S4). For example, when the advertiser 10 desires to distribute the advertising material in a plurality of times at predetermined intervals, the distribution member is to be decided for each distribution. In this case, even when the server controller 220 decides the distribution member once, the server controller 220 selects the distribution member again in the next distribution.

When there is no request information for which the distribution member is not decided (step S4/NO), the server controller 220 returns to the determination in step S1. Further, when there is request information for which the distribution member is not decided (step S4/YES), the server controller 220 selects the distribution member who distributes the advertising material based on the request information and the distribution member registration information (step S5). That is, the server controller 220 selects, based on the desired distribution area and the desired number of distribution sheets included in the request information and the distribution member registration information, a combination of distribution members who can distribute the designated desired number or more of distribution sheets of advertising material in the designated desired distribution area.

Next, the server controller 220 transmits an e-mail requesting performance of the nozzle check of the printer to the e-mail address of the distribution member selected in step S5 (step S6). The e-mail may contain the URL of the website from which the test image data 233 can be downloaded. In addition, the test image data 233 to be printed by the printer 33 for nozzle check may be attached in the e-mail.

Next, the server controller 220 determines whether the read data has been uploaded from the distribution member computer 31 (step S7). When the read data is not uploaded (step S7/NO), the server controller 220 advances the process to the determination of step S14. When the read data is uploaded (step S7/YES), the server controller 220 analyzes the received read data, and determines whether the printing quality of the test image printed by the printer 33 owned by the distribution member is good (step S8).

When the server controller 220 determines that the printing quality of the printer 33 owned by the distribution member is poor (step S8/NO), the server controller 220 determines whether the number of times the printing quality is determined to be poor is larger than a preset number of times (step S9). When the number of times the printing quality is determined to be poor is larger than the set number of times (step S9/YES), the server controller 220 selects another distribution member (step S10). The server controller 220 transmits an e-mail requesting performance of the nozzle check of the printer 33 to the e-mail address of the selected distribution member (step S6). Further, when the number of times the printing quality is determined to be poor is equal to or less than the set number of times (step S9/NO), the server controller 220 transmits, to the e-mail address of the distribution member selected in step S5, an e-mail indicating that the check result of the nozzle check is poor. This e-mail also contains a guidance requesting that the test image data 233 be printed again after the performance of nozzle cleaning, and the read data obtained by scanning the printed matter that has been printed be uploaded to the posting server 25 again.

When the check result of the nozzle check is good (step S8/YES), the server controller 220 transmits a request e-mail to the e-mail address of the distribution member (step S11). The request e-mail contains the URL of the website from which the advertisement data can be downloaded, information of the assigned area in which the distribution member is in charge of distribution, and information of the number of distribution sheets to be distributed by the distribution member.

Next, the server controller 220 determines whether the request e-mail has been transmitted to all the selected distribution members (step S12). When the request e-mail has been transmitted to all the selected distribution members (step S12/YES), the server controller 220 records a request completion flag indicating that the transmission of the request e-mail has been completed (step S13). When the request e-mail has not been transmitted to all the selected distribution members (step S12/NO), the server controller 220 returns to the determination in step S7, and determines whether the read data has been uploaded.

When the determination in step S7 is a negative determination (step S7/NO), the server controller 220 determines whether information indicating that the distribution of the advertising material has been completed has been uploaded from the distribution member computer 31 (step S14). Further, even when the request completion flag is recorded in step S13 (step S13), the server controller 220 advances the process to step S14 to determine whether information indicating that the distribution is completed has been uploaded.

When the information indicating that the distribution has been completed is not uploaded (step S14/NO), the server controller 220 determines whether the request completion flag is recorded (step S15). When the request completion flag is recorded (step S15/YES), the server controller 220 returns to the determination in step S14.

When the request completion flag is not recorded (step S15/NO), the server controller 220 determines whether a preset elapsed time has passed (step S16). This elapsed time may be an elapsed time after the distribution member is selected in step S5, or may be a time obtained by the reverse calculation from the distribution date and time of the advertising material desired by the advertiser 10. Here, it is because the number of distribution sheets of the advertising material requested by the advertiser 10 may not be distributed when the distribution member who can print and distribute the advertising material cannot be decided indefinitely that it is determined whether the elapsed time has passed.

When the elapsed time has not passed (step S16/NO), the server controller 220 returns the process to step S7 and determines whether the read data is uploaded (step S7). Further, when the elapsed time has passed (step S16/YES), the server controller 220 selects another distribution member (step S17), and transmits an e-mail requesting performance of the nozzle check to the e-mail address of the selected distribution member (step S6).

When the information indicating that the distribution has been completed has been uploaded (step S14/YES), the server controller 220 determines whether the information indicating that the distribution has been completed has been uploaded from all the distribution members (step S18). When information indicating that distribution has been completed is not uploaded from all the distribution members (step S18/NO), the server controller 220 advances the process to the determination of step S15. Further, when the information indicating that distribution has been completed has been uploaded from all distribution members (step S18/YES), server controller 220 notifies the advertiser 10 of the completion of the distribution of the advertising material (step S19).

As described above, the advertisement system 1 of the present embodiment includes the posting server 25 that distributes advertisement data, the distribution member computer 31 that causes the printing apparatus to print the distributed advertisement data. The distribution member computer 31 causes the printer 33 to print the test image data 233. In addition, the distribution member computer 31 transmits, to the posting server 5, the read data obtained by reading an image of a printed matter obtained by printing the test image data 233 by the printer 33. The posting server 25 includes the evaluation unit 255 that evaluates the printing quality of the printed matter based on the read data, and the decision unit 257 that decides, based on the evaluation result by the evaluation unit 255, whether to distribute the advertisement data to the distribution member computer 31. Therefore, the posting server 25 evaluates the printing quality of the printed matter based on the read data obtained by reading the printed matter printed by the printer 33, and decides whether to distribute the advertisement data to the distribution member computer 31, so that it is possible to suppress poor printing of the advertising material.

In addition, when the elapsed time from the transmission of the test image data 233 to the distribution member computer 31 to the reception of the read data is longer than a preset time, the decision unit 257 does not distribute the advertisement data to the distribution member computer 31.

In a case where the elapsed time is longer than the preset time, the printing quality of the printer 33 may be degraded. Therefore, when the elapsed time is longer than the preset time, the advertisement data is not distributed to the distribution member computer 31, so that it is possible to suppress poor printing of the advertising material.

The distribution member computer 31 transmits, to the posting server 25, the read data and the printing date and time when the printer 33 printed the test image data 233. When the difference between the printing date and time, and the date and time when the read data is received is greater than a preset time, the decision unit 257 does not distribute the advertisement data to the distribution member computer 31. When the difference between the printing date and time, and the date and time when the read data is received is greater than a preset time, printing may be performed by the printer 33 and the printing quality of the printer 33 may be degraded. Therefore, when the elapsed time is longer than the preset time, the advertisement data is not distributed to the distribution member computer 31, so that it is possible to suppress poor printing of the advertising material.

The printer 33 includes a wireless communication unit, the read data includes the identification information of the printer 33 that printed the test image data 233, and the decision unit 257 identifies the printer 33 based on the identification information and distributes the advertisement data to the identified printer 33. Therefore, the advertisement data can be directly transmitted to the printer 33 that has printed the test image data 233, and the printer 33 can print the advertising material. Therefore, it is possible to suppress poor printing of the advertising material.

When the evaluation unit 255 determines that the printing quality is poor, the decision unit 257 instructs the distribution member computer 31 to perform maintenance of the printer 33. Therefore, it is possible to suppress poor printing of the advertising material.

Second Embodiment

Next, the second embodiment of the present disclosure will be described with reference to the accompanying drawings. In the first embodiment described above, the distribution member computer 31 is installed at the distribution member's house 30, the distribution member computer 31 performs data communication with the posting server 25 and receives the test image data 233 and the advertisement data. In the second embodiment, the distribution member has a mobile terminal 37 such as a smartphone or a tablet PC instead of the distribution member computer 31.

Figure 10:
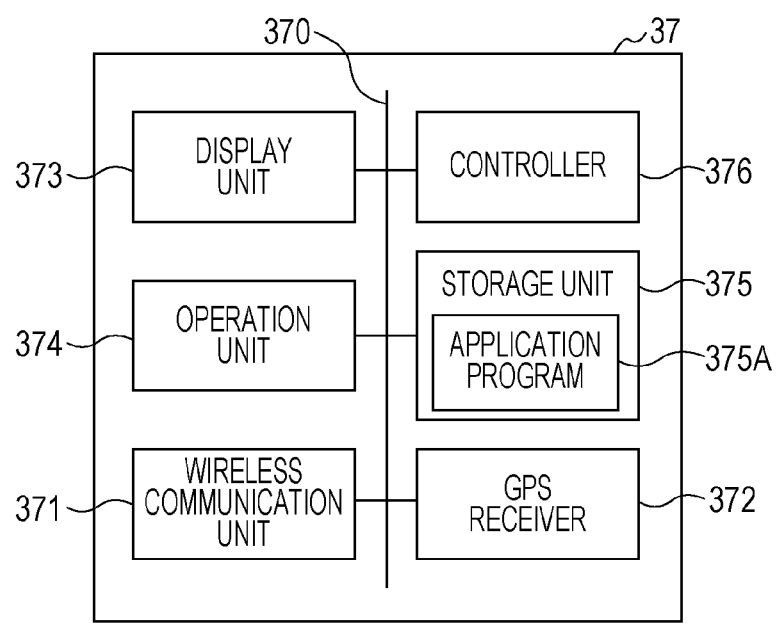
FIG. 10 is a configuration diagram of a mobile terminal.

FIG. 10 is a configuration diagram of the mobile terminal 37. The mobile terminal 37 includes a wireless communication unit 371, a global positioning system (GPS) receiver 372, a display unit 373, an operation unit 374, a storage unit 375, and a controller 376. The wireless communication unit 371 performs wireless communication with a base station of a mobile phone. The GPS receiver 372 receives a GPS signal transmitted from a GPS satellite. The GPS receiver 372 calculates the latitude and longitude, which are the location of the mobile terminal 37, based on the received GPS signal. The display unit 373 is configured by a liquid crystal display, an organic EL display, or the like. The operation unit 374 is configured by a touch panel provided on the display unit 373, and receives a user operation. The storage unit 375 is configured by a nonvolatile semiconductor memory such as an EEPROM or a flash memory. The storage unit 375 stores control programs such as an operating system (OS) and an application program 375A. The application program 375A is, for example, a program developed by a posting company, downloaded from the posting server 25, and installed in the mobile terminal 37.

The controller 376 includes a processor, and executes a control program stored in the storage unit 375 to control each unit of the mobile terminal 37.

Figure 11:
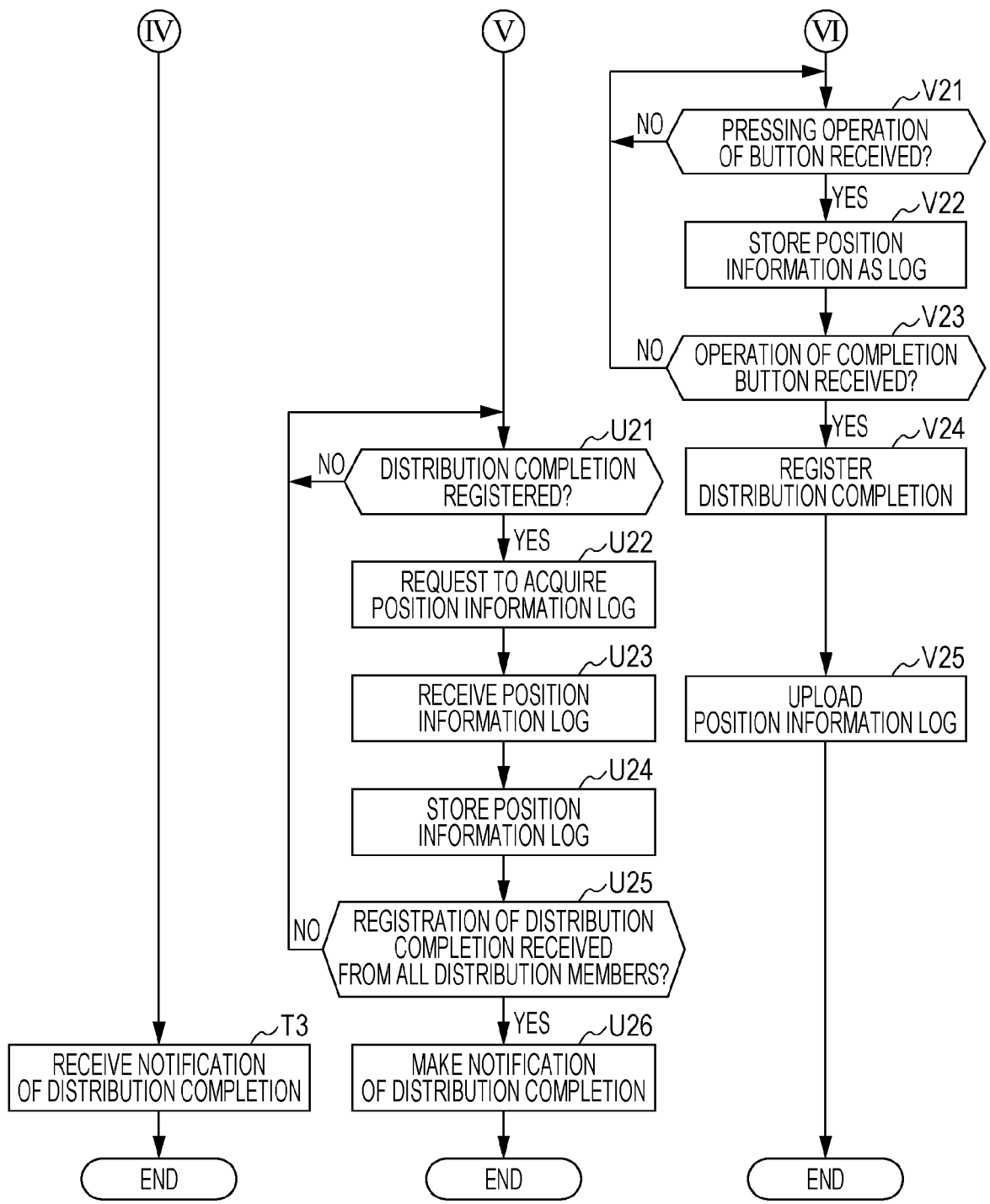
FIG. 11 is a flowchart showing the operation of the advertisement system.

FIG. 11 is a flowchart showing the operation of the advertisement system 1 according to the second embodiment. Since the operations of the advertiser computer 15, the posting server 25, and the distribution member computer 31 shown in the flowcharts of FIGS. 6 and 7 are common to those of the first embodiment, the operation after the posting server 25 transmits the request e-mail to the mobile terminal 37 will be described. In the second embodiment, the mobile terminal 37 performs the operation of the distribution member computer 31 in the first embodiment.

Upon receiving the request e-mail from the posting server 25, the mobile terminal 37 accesses the web page of the URL described in the received request e-mail by the operation of the operation unit 374 by the distribution member. The mobile terminal 37 displays the web page provided by the posting server 25 on the display unit 373. The mobile terminal 37 receives the operation of the operation unit 374 by the distribution member, and transmits, to the posting server 25, a request for downloading the advertisement data. Upon receiving the advertisement data download request from the operation unit 374, the posting server 25 downloads the advertisement data to the mobile terminal 37 (step U13).

The mobile terminal 37 receives the advertisement data from the posting server 25 (step V14). According to the operation by the distribution member, the mobile terminal 37 outputs the downloaded advertisement data to the printer 33 and causes the printer 33 to print the advertisement data to generate the advertising material for the number of distribution sheets described in the e-mail (step V15). For example, the printer 33 has a wireless communication function. The printer 33 performs wireless communication with the mobile terminal 37 and receives the advertisement data transmitted from the mobile terminal 37. The printer 33 prints the received advertisement data to generate the advertising material.

Further, the mobile terminal 37 causes the printer 33 to print the text of the e-mail by the operation of the operation unit 374 by the distribution member. The text of the e-mail contains map data indicating the location of the house where the distribution member distributes the advertising material. The distribution member has the mobile terminal 37, the advertising material for the number of distribution sheets, and the printed matter on which the map of the assigned area is printed, moves to the distribution destination of the advertising material while referring to the map data, and distributes the advertising material at the destination.

When moving to the assigned area, the distribution member activates the application program 375A downloaded from the posting server 25 and starts posting of the advertising material. When the distribution member moves to the distribution destination specified by the assigned area information, posts the advertising material, and presses a button displayed, by the application program 375A, on the display unit 373 of the mobile terminal 37. When the button is not pressed (step V21/NO), the application program 375A waits until the button is pressed. When the button is pressed (step V21/YES), the application program 375A acquires the position information of the GPS receiver 372, stores the acquired position information in the storage unit 375 as a log of the distribution destination (step V22).

Also, when the distribution member completes the distribution of the advertising material to all the distribution destinations specified by the assigned area information, the distribution member presses a completion button displayed on the display unit 373 by the application program 375A. When the operation of the completion button is not received (step V23/NO), the application program 375A returns to the determination of step V21. In addition, when the operation of the completion button is received (step V23/YES), the application program 375A accesses the web page of the posting server 25. The application program 375A registers the completion of the distribution in the web page by the operation of the operation unit 374 by the distribution member (step V24).

When the completion of the distribution is not registered in the web page (step U21/NO), the posting server 25 waits until the completion of the distribution is registered in the web page. Further, when the completion of the distribution is registered in the web page (step U21/YES), the posting server 25 transmits a request for acquiring the log of the position information to the mobile terminal 37 (step U22).

The application program 375A reads the log of the position information from the storage unit 375, and uploads the read log of the position information to the posting server 25 (step V25). Upon receiving the position information log from the mobile terminal 37 (step U23), the posting server 25 stores the received log in the server storage unit 230 (step U24).

Next, the posting server 25 determines whether registration of the completion of the distribution has been received from all distribution members to who the request e-mail is transmitted in step U11 (step U25). When the posting server 25 does not receive registration of the completion of the distribution from all the distribution members (step U25/NO), the process returns to step U21. Further, when the posting server 25 receives registration of the completion of the distribution from all distribution members (step U25/YES), the posting server 25 notifies the advertiser computer 15 of the distribution completion of the advertising material on the set distribution date (step U26). This notification may be transmitted, through the e-mail, to the e-mail address of the advertiser 10 registered in advance. The advertiser computer 15 receives the notification of the distribution completion by receiving the e-mail by the operation of the advertiser 10 (step T3). The advertiser computer 15 opens the received e-mail by the operation of the advertiser 10 to notify the advertiser 10 that the distribution of the advertising material on the set distribution date is completed.

The embodiment described above is merely an aspect of the present disclosure, and any modification and application can be made within the scope of the present disclosure. For example, in the first embodiment described above, before uploading the read data to the posting server 25, the distribution member computer 31 may have a configuration of acquiring information of the remaining amount of ink in the printer 33 from the printer 33. The distribution member computer 31 uploads the acquired information of the remaining amount of ink and the read data to the posting server 25.

The posting server 25 decides the number of distribution sheets of the advertising material to be distributed by the distribution member based on the uploaded information of the remaining amount of ink. Further, the posting server 25 may determine whether the printer 33 can print the advertising material for the number of distribution sheets to be distributed by the distribution member based on the information of the remaining amount of ink of the printer 33 and the number of distribution sheets to be distributed by the distribution member. When the posting server 25 determines that it is not possible to print the advertising material for the number of distribution sheets, the posting server 25 may transmit an e-mail requesting replenishment of ink to the e-mail address of the distribution member. When the posting server 25 receives, on the web page, an input indicating that the replenishment of the ink of the printer 33 has been completed, the posting server 25 causes the distribution member to distribute the advertising material for the number of distribution sheets.

In the first embodiment described above, the case has been described where the distribution member computer 31 and the printer 33 are independently configured, but the controller of the printer 33 may serve as the control device. That is, the printer 33 may be configured to serve as a control device and a printing apparatus.

In the first embodiment described above, the distribution member computer 31 outputs the test image data 233 downloaded from the posting server 25 to the printer 33 and causes the printer 33 to perform printing. In another embodiment, the configuration may be such that the distribution member computer 31 or the printer 33 stores the test image data 233 in advance. Upon receiving the print instruction of the test image data 233 from the posting server 25, the distribution member computer 31 outputs the stored test image data 233 to the printer 33 to cause the printer 33 to perform printing. When receiving the print instruction of the test image data 233 from the posting server 25, the distribution member computer 31 transmits the print instruction to the printer 33. The printer 33 prints the test image data 233 stored in advance.

Further, when the method of controlling the server apparatus is implemented by a computer provided in the posting server 25, the program to be executed by the computer may be configured in a form of a recording medium or a transmission medium for transmitting the program. As the recording medium, a magnetic or optical recording medium or a semiconductor memory device can be used. Specifically, a portable or fixed recording medium such as a flexible disk, an HDD, a compact disc read-only memory (CD-ROM), a digital versatile disc (DVD), a Blu-ray disc, a magneto-optical disk, a flash memory, and a card-type recording medium may be used. Further, the recording medium may be a nonvolatile storage device such as a random-access memory (RAM), a read-only memory (ROM), and an HDD, which are internal storage devices included in the server apparatus. The Blu-ray is a registered trademark.

The processing stages in the flowcharts of FIGS. 6 to 9 and 11 are separated according to the main processing content in order to facilitate understanding of the processing by the advertiser computer 15, the posting server 25 and the distribution member computer 31. The way the processing stages are separated and the names of the processing stages in the flowcharts of FIGS. 6 to 9 and 11 do not limit the present disclosure. The processing by the advertiser computer 15, the posting server 25, and the distribution member computer 31 can be separated into more processing stages according to the processing content and can also be separated in such a way that one processing stage includes more processes. Further, the order of processing in the flowcharts is not limited to the shown example.

What is claimed is:

1. An advertisement system comprising: a server apparatus that distributes advertisement data; and a control device that causes a printing apparatus to the print distributed advertisement data, wherein
the control device
causes the printing apparatus to print test image data, and
transmits, to the server apparatus, read data obtained by reading a printed matter of the test image data, and wherein
the server apparatus includes
an evaluation unit that evaluates printing quality of the printed matter based on the read data, and
a decision unit that decides whether to distribute the advertisement data to the control device based on an evaluation result by the evaluation unit.

2. The advertisement system according to claim 1, wherein the decision unit does not distribute the advertisement data to the control device when an elapsed time from transmission of the test image data to the control device to reception of the read data is greater than a preset time.

3. The advertisement system according to claim 1, wherein
the control device transmits, to the server apparatus, the read data and a printing date and time when the printing apparatus prints the test image data, and wherein
the decision unit does not distribute the advertisement data to the control device when a difference between the printing date and time, and a date and time when the read data is received is greater than a preset time.

4. The advertisement system according to claim 1, wherein
the printing apparatus includes a communication unit, wherein
the read data includes identification information of the printing apparatus that printed the test image data, and wherein
the decision unit identifies the printing apparatus based on the identification information and distributes the advertisement data to the identified printing apparatus.

5. The advertisement system according to claim 1, wherein the decision unit instructs the control device to perform maintenance of the printing apparatus when the evaluation unit determines that the printing quality is poor.

6. A server apparatus that distributes advertisement data, the server apparatus comprising:
a communication unit that receives read data obtained by reading a printed matter on which test image data is printed;
an evaluation unit that evaluates printing quality of the printed matter based on the read data received by the communication unit; and
a decision unit that decides whether to distribute the advertisement data to a transmission source of the read data based on an evaluation result by the evaluation unit.

7. A non-transitory computer-readable storage medium storing a program, the program causing a computer of a server apparatus that distributes advertisement data to execute a method, the method comprising:
receiving read data obtained by reading a printed matter on which the test image data is printed;
evaluating printing quality of the printed matter based on the read data received by the receiving the read data; and deciding whether to distribute the advertisement data to a transmission source of the read data based on an evaluation result by the evaluating the printing quality.

* * * * *